Feb. 21, 1950 — P. E. MARKHAM — 2,497,999
HEDGE TRIMMER
Filed Dec. 4, 1946 — 2 Sheets-Sheet 1

Inventor
P. E. Markham
By Atrow & Co.
Attorneys.

Feb. 21, 1950   P. E. MARKHAM   2,497,999
HEDGE TRIMMER
Filed Dec. 4, 1946   2 Sheets-Sheet 2
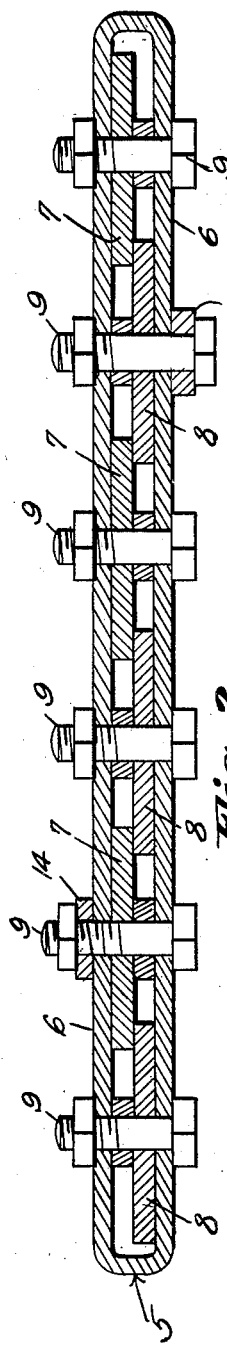
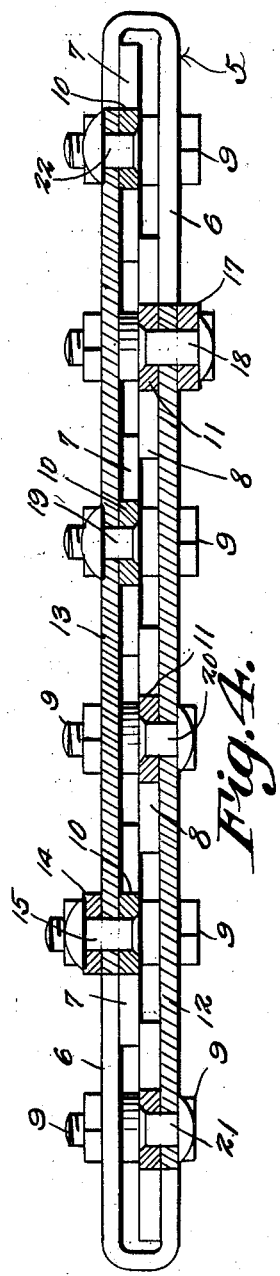
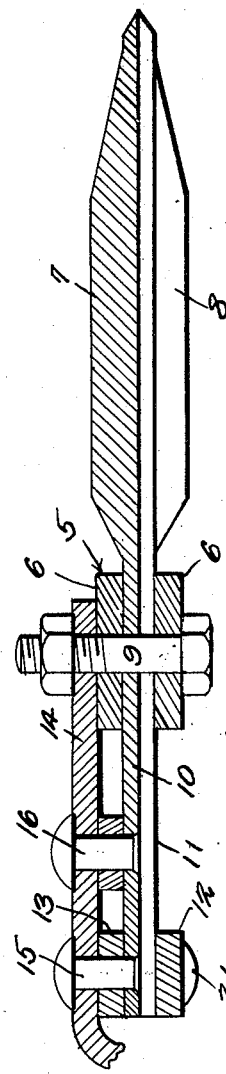
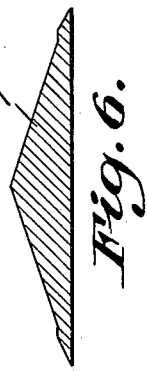
Inventor
P. E. Markham
By CHKnowles.
Attorneys Patented Feb. 21, 1950

2,497,999

UNITED STATES PATENT OFFICE 2,497,999

HEDGE TRIMMER

Philip E. Markham, Los Angeles, Calif., assignor of one-half to William Evans, Caldwell County, Tex.

Application December 4, 1946, Serial No. 713,999

1 Claim. (Cl. 30—208)

This invention relates to shears designed primarily for trimming hedges or like shrubbery.

The primary object of the invention is to provide hedge shears embodying pivoted cutter blades, the pivoted cutter blades being so constructed and arranged with respect to each other, that the blades cut with both edges as they are rocked, thereby insuring a smooth and even cutting of the hedge.

Another important object of the invention is to provide a cutter of this character, embodying what might be termed a plurality of independent cooperating cutter blades so balanced that the shears may be easily operated or handled.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 1:
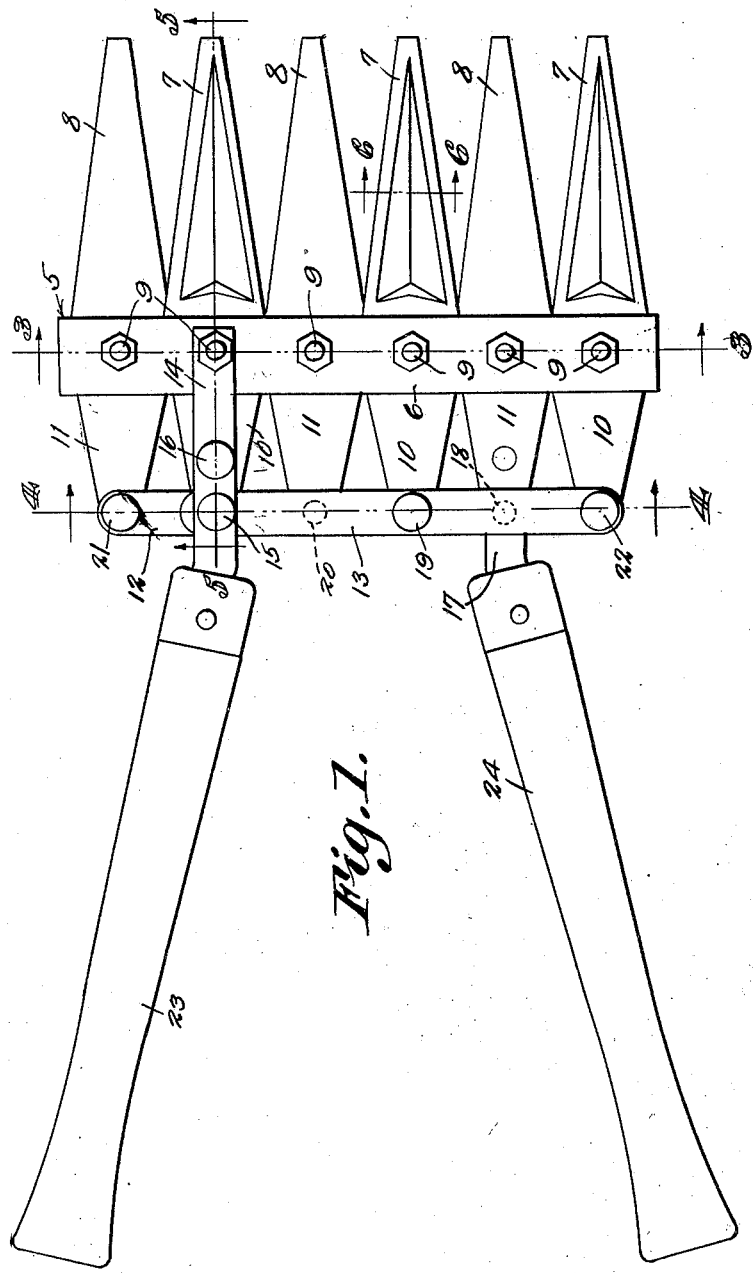
Figure 1 is a plan view of hedge shears constructed in accordance with the invention.
Figure 2:
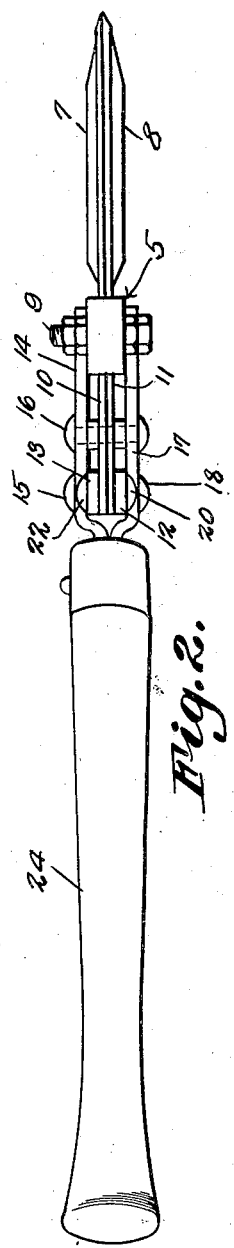
Figure 2 is a side elevational view of the tool.

Referring to the drawings in detail, the shears comprise a main supporting bar 5, which comprises upper and lower spaced parallel bars 6.

The blades of the trimmer include upper blades 7 and lower blades 8, the blades 7 and 8 being pivotally mounted on the bar 6 by bolts 9, at points intermediate the ends of the blades, leaving the rear ends 10 of the upper blades and the rear ends 11 of the lower blades, extended beyond the rear edge of the main supporting bar, as clearly shown by Figure 1 of the drawings. The cutting blades are formed with cutting edges throughout the major portion of their lengths, and the cutting edges of adjacent blades are so disposed that when the blades are pivoted, the blades will come together in cutting relation to cut the hedge therebetween.

The reference character 12 includes a bar that connects the lower blades 8, while the bar 13 connects the blades 7, at the rear ends thereof.

The reference character 14 indicates an actuating arm that has pivotal connection with one of the bolts 9, and also has pivotal connection with the rear end 10 of the blade disposed directly thereunder by means of the rivet 15. A rivet 16 also secures the actuating arm 14 to the end 10, so that movement of the arm 14 will cause a relative movement of the upper blades 7.

Connected with the bar 12 is an arm 17, which is also connected to the rear end of the blade 8 directly thereover, by means of the rivet 18. The arm 17 has pivotal connection with the bar 5, through the bolt 9, that connects the blade 8 with the bar 5, directly thereover.

The upper bar 13 connects with the end of the blade 7 between the remaining blades 7 of the cutter, by means of the pivot 19, while the intermediate blade 8 of the lower group of blades, connects with the bar 12, by means of the pivot pin 20 that extends through the rear end of the intermediate blade 8 and passes through the bar 12.

The connection between the bar 12 and rear end of the blade 8 at one end of the shears, is made through the pivot pin 21, while the connection between the rear end of the blade 7 at the opposite side of the shears, and the bar 13, is made with the pivot pin 22.

Thus it will be seen that due to this construction, there are two groups of blades, the upper blades 7 and the lower blades 8, which when reciprocated will cause a cutting action to trim the hedge or foliage to be cut.

The handle 23 connects with the outer opposite end of the arm 14, while the handle 24 connects with the outer end of the arm 17, so that the handle may be gripped and held by the operator when manipulating the shears in trimming a hedge.

Having thus described the invention, what is claimed is:

Hedge shears comprising a supporting member embodying spaced upper and lower parallel bars connected at their ends, rows of upper and lower blades pivotally mounted between the bars, the rear ends of said blades extending an appreciable distance beyond the supporting member, an actuating bar to which the rearwardly extended ends of the blades of the upper row of blades are connected, a bar to which the rear ends of the blades of the lower row of blades are connected, an operating arm pivotally connected with the supporting member and being pivotally connected to the operating bar to which the row of upper and lower blades are connected, an operating bar pivotally connected to the supporting member and to which the blades of the lower row of blades are connected, and handles secured to the operating bars by means of which the rows of blades are operated with respect to each other, cutting hedge between the pivoted blades.

PHILIP E. MARKHAM.

REFERENCES CITED

The following references are of record in the file of this patent:

UNITED STATES PATENTS

| Number | Name | Date |
| --- | --- | --- |
| 1,980,092 | Rose | Nov. 6, 1934 |
| 2,105,576 | Wittek | Jan. 18, 1938 |